(12) United States Patent
Jellema et al.

(10) Patent No.: US 6,658,851 B2
(45) Date of Patent: Dec. 9, 2003

(54) APPARATUS FOR SUBLIMING OR CONDENSING A WATER-CONTAINING FLUID IN A CLOSED SPACE

(75) Inventors: Pieter Jellema, Oss (NL); Jelle Luutzen Nijdam, Veldhoven (NL)

(73) Assignee: Solutherm B.V., Vlinderhof (NL)

( * ) Notice: Subject to any disclaimer, the term of this patent is extended or adjusted under 35 U.S.C. 154(b) by 0 days.

(21) Appl. No.: 10/168,191

(22) PCT Filed: Oct. 18, 2001

(86) PCT No.: PCT/NL01/00766
§ 371 (c)(1),
(2), (4) Date: Oct. 21, 2002

(87) PCT Pub. No.: WO02/32535
PCT Pub. Date: Apr. 25, 2002

(65) Prior Publication Data
US 2003/0097842 A1 May 29, 2003

(30) Foreign Application Priority Data
Oct. 18, 2000 (NL) .............................................. 1016434

(51) Int. Cl.$^7$ ................................................. F01B 31/06
(52) U.S. Cl. ............................... 60/687; 60/690; 60/694
(58) Field of Search ........................ 60/685, 687, 690, 60/694

(56) References Cited

U.S. PATENT DOCUMENTS

| | | | | |
|---|---|---|---|---|
| 3,589,104 A | * | 6/1971 | Panzarella | 95/193 |
| 3,828,575 A | * | 8/1974 | Malcosky et al. | 62/476 |
| 4,424,688 A | * | 1/1984 | Wilkinson | 62/476 |
| 4,545,217 A | * | 10/1985 | Nakao et al. | 62/476 |
| 5,284,029 A | * | 2/1994 | Keuper et al. | 62/476 |
| 5,542,267 A | * | 8/1996 | Lee et al. | 62/485 |

FOREIGN PATENT DOCUMENTS

DE 3441074 * 5/1985

* cited by examiner

Primary Examiner—Hoang Nguyen

(57) ABSTRACT

An apparatus for subliming or condensing a water-containing fluid, which apparatus is provided with a tubular holder (1) having a longitudinal direction and at east one tube (2) extending in that longitudinal direction at least within the holder (1), wherein the holder is provided with at least one inlet (5) and at least one outlet (6), there being further provided at least one supply (3) and at least one discharge (4), which are in communication with the interior of the at least one tube (2), which on one side extends through a wall of the holder an is sealingly secured therein an don the other side within the holder terminates with a free end, closed with respect to the interior of the holder, which free end is guided so as to be slidable in longitudinal direction, by guide means which are located at a distance from the wall in which the tube is scalingly secured.

11 Claims, 1 Drawing Sheet

APPARATUS FOR SUBLIMING OR CONDENSING A WATER-CONTAINING FLUID IN A CLOSED SPACE

The invention relates to an apparatus for subliming or condensing a water-containing fluid, which apparatus is provided with a tubular holder having a longitudinal direction and at least one tube extending in that longitudinal direction at least within the holder, wherein the holder is provided with at least one inlet and at least one outlet, there being further provided at least one supply and at least one discharge, which are in communication with the interior of the at least one tube, which extends through a wall of the holder and is sealingly secured therein.

Such an apparatus, as is known from DE-A1-34 41 074, can be used in a method for refining oil or fat, wherein during a deodorization phase, fatty acids, aroma and flavor and other volatile substances are removed from the oil or the fat. This is done, for instance, by contacting the product to be treated, the oil or the fat, with steam of a temperature in the order of magnitude of 200° C., the so-called strip steam. The strip steam is, for instance, introduced at the lower end into a vat in which the product to be treated is present and dissolves by-products and impurities, such as fatty acids, from that product. Through an appropriate choice of the parameters, a stable, refined, tasteless and odorless oil can be obtained.

The process referred to works best at pressures of 10 mbar or less. To be able to maintain this reduced pressure in the holder, the strip steam with the impurities dissolved therein is discharged from the vat, whereafter the impurities are to be separated. This is done by supplying the discharged fluid to the holder in which tubes are present which are cooled with a refrigerant, for instance liquid ammonia. The fluid supplied sublimes or condenses on the cooled tubes, so that an ice layer is formed on the tubes. This process is sometimes designated by the name of "dry condensing".

The ice layer forming on the tubes must from time to time be removed in order for the formation of the ice layer, and hence the process, not to come to a halt. Moreover, the energy consumption increases according as the ice layer becomes thicker. Frequent defrosting is therefore necessary to keep the efficiency of the process high and energy consumption low. Frequent defrosting, however, necessitates frequent interruption of the process. This means not only that costly production time is lost, but also that frequent heating up and cooling down is required, which means, in addition to a considerable energy consumption, that the plant is frequently exposed to high shrinkage and expansion forces and hence must be of relatively heavy construction, so that the energy consumption for heating up and cooling down increases still further. Also, a heavy and complicated construction provided with compensation means increases the cost price.

Frequent defrosting can be reduced by using a so-called wet condensing process. In such process, as known, for instance, from U.S. Pat. No. 3,589,104, during condensing or subliming of the water-containing fluid, a liquid film of a temperature approximately equal to that of the refrigerant is passed over the tubes. The water-containing fluid then condenses or sublimes on the liquid film, without this involving freezing on, because the condensed or sublimed water-containing fluid is discharged via the liquid film. Thus, defrosting is not necessary, or at least much less frequently so, but this does not mean that the problems inherent to high shrinking and expansion forces in starting up and switching off the apparatus have thus been remedied.

The object of the invention is to improve an apparatus as referred to in the opening paragraph, such that this apparatus at start-up and switch-off is no longer subject to high shrinking and expansion forces, and thus can be made of considerably lighter and cheaper construction and design, and can be operated with a lower energy consumption.

This is achieved according to the invention in that the at least one tube within the holder terminates with a free end, closed with respect to the interior of the holder, such that the at least one tube within the tubular holder, from the wall in which that tube is sealingly secured, can freely expand and shrink. Through these features, a construction typically comprising a bank of tubes can be realized, which, in contrast to, for instance, tubes extending between two tube plates and secured therein on two sides, is virtually insensitive to shrinkage and expansion stresses, thereby enabling a relatively light construction. An apparatus thus designed is suitable to be used both in a wet condensing and in a dry condensing process, with all the associated advantages of savings of energy and costs.

In particular in case of a typically used tube bank within the tubular holder, it may be provided, in accordance with a further embodiment of the invention, that the free end of each tube is guided so as to be slidable in the longitudinal direction of the tubular holder, by guiding means which are spaced from the wall in which the tubes are sealingly secured. Thus, expansion and contraction of each tube occur in a controlled manner, and the desired configuration of the tubes within the holder is always maintained, so that an optimal flow pattern within the holder can always be effected as well.

By securing the at least one tube on one side, a free internal space can be created in the tubular holder beyond the free end of the tube. This internal free space can be situated adjacent the discharge of the at least one tube. It is preferred, however, that the internal free space is created at the supply. In that case, it is possible, in a further advantageous manner, in accordance with a further elaboration of the invention, that the at least one tube extends substantially parallel to the longitudinal direction of the tubular holder through a first end wall thereof and has its free end terminating before a second end wall, located opposite the first end wall, in or adjacent which, viewed in the direction of the at least one tube, beyond the free end thereof, the at least one inlet is arranged. Through these features, the whole heat exchanging surface of the at least one tube can be optimally utilized, so that the output of the apparatus can be improved.

The possibility of feeding the at least one tube at the free end thereof without adversely affecting the free expansion within the holder is preferably realized in that the at least one tube at or adjacent the free end is connected with the supply by means of a relatively easily bendable connecting tube which has such a length that the free end upon displacement can be smoothly followed through bending. A particularly favorable flow pattern within the at least one tube can then be obtained if the connecting tube has a diameter which is smaller than that of the at least one tube and opens into it with an arrangement eccentric relative to the axis of the at least one tube, with a tangential outflow direction. Thus an optimum distribution of the refrigerant over the inner circumference of the at least one tube can be accomplished and a cooling as uniform as possible can thereby be obtained.

If, as has been noted to be typically the case, a number of tubes are accommodated mutually parallel in the holder, it is preferred, according to a further embodiment of the invention, that the free ends of those tubes are each connected through a connecting tube with a dividing element. In order then to keep the number of breaks through the wall of the holder as low as possible, it is further preferred that the dividing element is disposed within the holder, and the supply linking up with the dividing element extends through a holder wall, so that a single wall interruption can suffice for the supply of the refrigerant.

For similar reasons, for the purpose of applying the apparatus in the wet condensing process, it is preferably provided that at or above the free end of the at least one tube a distribution element is arranged, with which a liquid film can be provided on the at least one tube. For intensifying the contact between the liquid film and the water-containing fluid, it may further be provided that a number of tubes are accommodated mutually parallel in the holder, while at least at one level between the free ends of the tubes and the securing point in the holder wall a baffle plate is arranged over a part of the passage of the holder, which baffle plate, adjacent the at least one tube, is provided with a passage which does not disturb the liquid film.

According to a further embodiment of the invention, it is proposed that a number of tubes are accommodated mutually parallel in the holder, which tubes all terminate on one side outside the holder in a collecting element. True, compared with a collecting element arranged within the holder, such a design involves a greater number of wall interruptions, but they can here be used in an advantageous manner for securing the tubes in the holder on one side, for instance by designing the respective holder wall as a tube plate.

For keeping the tubes in position on the other side, without clamping, it is proposed, according to a further embodiment of the invention, that the guide means comprise at least one strip with at least one passage eye, which passage eye is adapted for longitudinally sliding guidance and positioning of the free end of the at least one tube.

Referring to an exemplary embodiment represented in the drawing, presently, albeit exclusively by way of non-limiting example, an embodiment of the apparatus for subliming or condensing a water-containing fluid will be further discussed. In the drawing.

Figure 1:
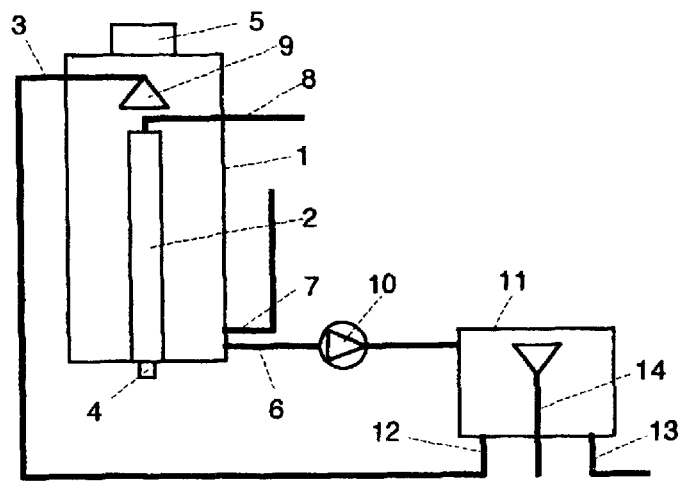
FIG. 1 shows in block diagram a treatment process for strip steam.

In FIG. 1 a holder 1 is represented for condensing or subliming a so-called strip steam. Such a strip steam originates, for instance, from a device for refining oil. The quality of refined oil is determined to a considerable extent by the so-called deodorization process, whereby fatty acids, aroma and flavors and other volatile substances are removed from the oil by bringing the product to a high temperature by means of the strip steam at an absolute pressure of 3 to 4 mbar, preferably 1.5 to 2 mbar.

The strip steam coming from the deodorization process is to be sublimed or condensed and stripped of impurities. Subliming or condensing takes place in the holder 1, which to that end is designed as a heat exchanger with an internally cooled tube bank 2. The internal cooling of the tube bank 2 takes place with the aid of a refrigerant, for instance liquid ammonia, of a temperature of −28° C., supplied through a supply 3 and discharged via a discharge 4. Further, the holder 1 is provided with an inlet 5 for bringing the strip steam into the holder, and an outlet 6 for the condensed or sublimed strip steam. A further outlet 7 is present for gases that remain volatile. To enable working according to the wet condensing process, a further inlet 8 is present for supplying a liquid, which liquid, by means of a distribution element 9, can be provided as a liquid film on the outer surface of the tube or tubes forming the tube bank 2, while the liquid forming the film is discharged, together with the sublimed or condensed strip steam, via the outlet 6.

The outlet 6 is connected, by means of a pipe which includes a pump 10, with a tank 11, which is provided with a discharge 12, which is connected with the inlet 8, and further with a discharge 13 and a discharge 14.

Figure 2:
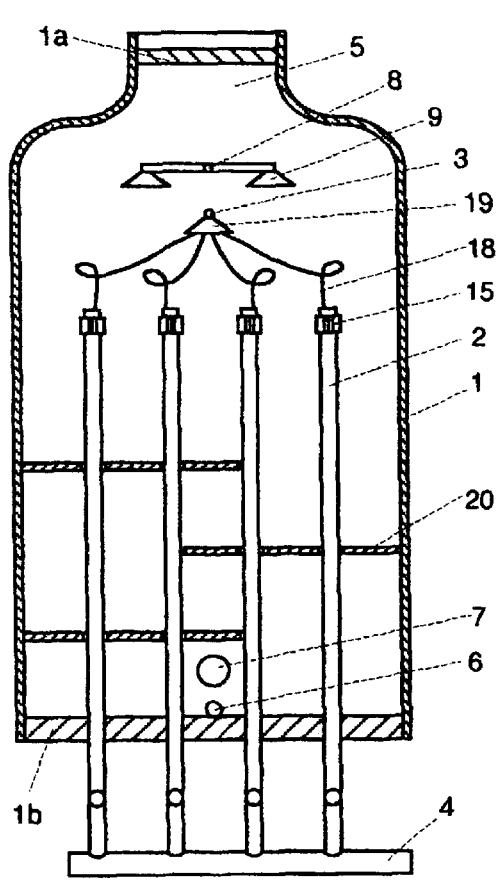
FIG. 2 shows in cross section an apparatus according to the invention.
Figure 3:
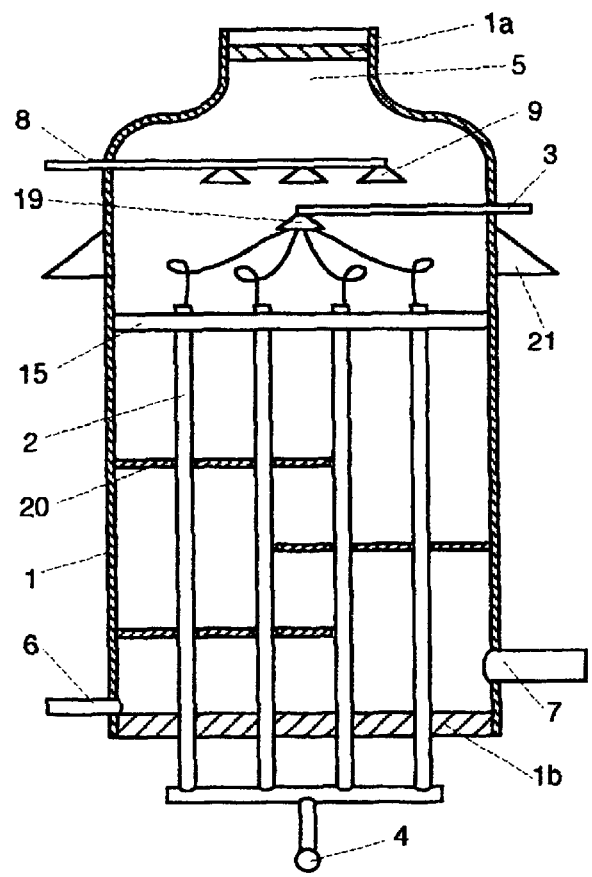
FIG. 3 shows a cross section along the line III—III in FIG. 2.

The holder 1 is worked out in more detail in FIGS. 2 and 3. The holder is formed by a tubular vat, arranged upright, having at the top the inlet 5 closable by a butterfly valve 1*a* and being closed at the bottom by a tube plate 1*b* through which extend the tubes of the tube bank 2. The tubes have been sealingly secured in the tube plate 1*b* and extend in the holder 1 over a part of the height thereof. The tubes terminate, at a distance from the top of the holder, in a free end which is closed off relative to the interior of the holder. Adjacent that free end, the tubes are held in position by guide means in the form of brackets 15 mounted on the holder 1, in which brackets, as shown best in FIG. 4, openings 16 have been formed, each to receive a tube belonging to the tube bank 2 in a manner allowing longitudinal sliding thereof.

In the exemplary embodiment represented, the holder 1 has been given a kind of bottle shape by situating the inlet 5 at the top. From the viewpoint of manufacturing technique, it may be preferable to make the holder of tubular design and to close it with a disc-shaped end plate and to design the inlet in the form of a lateral connecting stub. This does not change the operation of the apparatus.

Each tube of the tube bank 2 is closed off at its top by a disc 17, through which extends, eccentrically relative to the axis of the tube, an injection pipe 18 of a diameter considerable smaller than that of the tube. The injection pipe 18 has a flanged end in the tube, so that the injection pipe 18, relative to the tube, has a tangentially directed mouth. The end of the injection pipe 18 located outside the tube links up with a dividing element 19 which is fed by the supply 3. Further, in the holder 1, at different levels, baffles 20 are arranged, which extend between the tubes, though surrounding them in spaced relation therefrom, over a part of the free circumference of the holder 1. The dividing element is represented as a head. Another possible design is a system of pipes with flexible hoses attached thereto.

The operation of the apparatus described is as follows.

Figure 4:
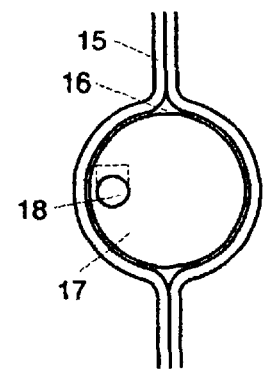
FIG. 4 shows a top plan view of a cooling tube.

The holder 1 is brought to the desired pressure and temperature by means not further shown. Difference in shrinkage upon cooling between the holder 1 and the tubes of the tube bundle 2 present in the holder 1 and secured on one side in the holder 1 will be taken up by displacement of the tubes relative to the brackets 15 connected with the holder 1. The thin injection pipes are so shaped, as represented in FIGS. 3 and 4 with a curl, that they can easily compensate, through deformation, any shrinkage difference between the dividing element 19, which is fixedly connected with the holder 1, and the top of the tubes. Thus, the holder 1, which can be held in its upright position by its resting through supports 21 on a frame (not shown), can be made of relatively light construction, since it is hardly, if at all, subject to shrinkage and expansion stresses.

Before starting the sublimation or condensation process, the tubes of the tube bundle 2 are internally cooled by introducing a refrigerant via the supply 3 into the dividing element 19, which takes care of the supply of the various injection pipes 18 with refrigerant, for instance liquid ammonia, which injection pipes 18, due to their tangential mouth, provide a fluid film on the inner surface of the tubes. Also, a liquid of a temperature comparable to that of the refrigerant, for instance −28° C., and a freezing point lower than the evaporation temperature of the refrigerant, is supplied via the inlet 8 to the distribution element 9, which, through spraying, takes care of the provision of a liquid film on the outer surface of the tubes of the tube bank 2.

Next, the butterfly valve 1a is opened, so that strip steam can enter the holder 1. The strip steam sublimes or condenses on the liquid film and is dissolved therein. The liquid and the dissolved strip steam flow down along the tubes, which is not hindered by the baffle plates 20, since these surround the tubes at a distance, but do provide that the strip steam is intensively contacted with the liquid film on the tubes, so that a sublimation or condensation of the strip steam as complete as possible is effected. Having arrived at the tube plate 1b, the mixture is extracted via the outlet 6 by the pump 10 and introduced into the tank 11 where the aqueous phase of the strip steam dissolved in the liquid is removed from the liquid via the discharge 13 and fats are removed from the liquid via the discharge 14, while the liquid can be recycled via the discharge 12 to the inlet 8 of the holder 1 for reuse.

Separating the fats can be carried out in any suitable manner, for instance by making use of a difference in mass density between the various components, one option to be considered here involving so-called skimming when the fats float on the liquid. The separation of the aqueous phase from the strip steam can likewise be done in various ways, for instance through filtration techniques, such as reversed osmosis or ultrafiltration, through evaporation, as known in desalination plants and purification techniques, or by crystallization, for instance through vacuum ice technique.

It will be clear from the above description that the wet condensing process discussed makes a continuous process operation possible. If intermittent operation is sufficient, this is equally possible with the apparatus described, whilst maintaining its relatively light construction. In that case, it is possible to dispense with the supply of liquid and the provision of a liquid film on the outer surface of the tubes of the tube bundle 2, that is, to work according to the dry condensing process. The strip steam supplied will then sublime or condense and freeze onto the outer surface of the deep-cooled tubes. Growth of an ice layer on the tubes, however, diminishes the efficiency of the process to an increasing extent. Therefore, from time to time, the process must be stopped and the ice formed must be thawed. After this treatment, and optionally stripping the tubes of adherent fatty components from the strip steam, the holder is to be brought to the desired low pressure and temperature before the sublimation or condensation process can be started again. Since in this process the holder and the tube bank must be cooled and heated regularly, the relative shrinkage and expansion insensitivity of the apparatus is particularly advantageous.

It is evident that within the framework of the invention as laid down in the appended claims many modifications and variants are possible in addition to those already indicated and discussed in the foregoing. Thus, for instance, the tube plate 1b can be dismountably arranged in the holder, affording the possibility of relatively easily removing the tube bank 2 from the holder 1 for inspection, maintenance or replacement. Further, the tubes could all terminate within the holder in a joint outlet, so that the tube plate only needs to have a single passage. Also, the tubes could terminate in the tube plate 1b with an end open towards the outside, while on the holder there is mounted a collecting bin, closed to the surroundings, for collecting and discharging refrigerant. Although in the exemplary embodiment reference has been made to a tube bank, the method is equally practicable with a plate package as heat exchanging body. In the exemplary embodiment, the tubes have their discharge ends secured in the tube plate. It will be clear that this can also be the other way around, that is, the tubes have their supply ends secured in a tube plate and have their discharge ends terminating freely within the holder. A further variant that can be considered is to guide the strip steam through bank tubes cooled on the outside, which design can be considered possible in particular in the practice of the wet condensing process. Although the apparatus according to the invention has been described with reference to a process for processing strip steam, it will be clear that this exemplary embodiment is not intended to limit the invention to that specific area of the art, but that the invention is equally applicable in other processes where a water-containing fluid is to be sublimed or condensed.

What is claimed is:

1. An apparatus for subliming or condensing a water-containing fluid, which apparatus is provided with a tubular holder having a longitudinal direction and at least one tube extending in that longitudinal direction at least within the holder, wherein the holder is provided with at least one inlet and at least one outlet, there being further provided at least one supply and at least one discharge, which are in communication with the interior of the at least one tube, which extends through a wall of the holder and is sealingly secured therein, characterized in that the at least one tube within the holder terminates with a free end, closed with respect to the interior of the holder, such that the at least one tube within the tubular holder, from the wall in which that tube is sealingly secured, can freely expand and shrink.

2. An apparatus according to claim 1, characterized in that the free end of the at least one tube is guided, so as to be slidable in the longitudinal direction of the tubular holder, by guide means which are located at a distance from the wall in which the tube is sealingly secured.

3. An apparatus according to claim 1 or 2, characterized in that the at least one tube extends substantially in the longitudinal direction of the tubular holder through a first end wall thereof and has its free end terminating before a second end wall, located opposite the first end wall, in or adjacent which, viewed in the direction of the at least one tube, beyond the free end thereof, the at least one inlet is arranged.

4. An apparatus according to at least one of the preceding claims, characterized in that the at least one tube, at or adjacent the free end, is connected with the supply by means of a relatively easily bendable connecting tube which has such a length that the free end upon displacement can be smoothly followed through bending.

5. An apparatus according to claim 4, characterized in that the connecting tube has a diameter which is smaller than that of the at least one tube and opens into it with an arrangement eccentric relative to the axis of the at least one tube, with a tangential outflow direction.

6. An apparatus according to at least one of the preceding claims, characterized in that a number of tubes are accommodated mutually parallel in the holder, while the free ends of those tubes are each connected through a connecting tube with a dividing element.

7. An apparatus according to claim 6, characterized in that the dividing element is arranged within the holder and the supply linking up with the dividing element extends through a holder wall.

8. An apparatus according to at least one of the preceding claims, characterized in that at or above the free end of the at least one tube a distribution element is arranged, with which a liquid film can be provided on the at least one tube.

9. An apparatus according to at least one of the preceding claims, characterized in that a number of tubes are accommodated mutually parallel in the holder, while at least at one level between the free ends of the tubes and the securing point in the holder wall a baffle plate is arranged over a part of the passage of the holder, which baffle plate, adjacent the at least one tube, is provided with a passage which does not disturb the liquid film.

10. An apparatus according to at least one of the preceding claims, characterized in that a number of tubes are accommodated mutually parallel in the holder, which tubes all terminate on one side outside the holder in a collecting element.

11. An apparatus according to at least one of the preceding claims, characterized in that the guide means comprise at least one strip with at least one passage eye, which passage eye is adapted for longitudinally sliding guidance and positioning of the free end of the at least one tube.

* * * * *